United States Patent
Peckham et al.

(10) Patent No.: US 7,278,379 B2
(45) Date of Patent: Oct. 9, 2007

(54) HEAT EXCHANGE SYSTEM

(75) Inventors: John M. Peckham, Burleson, TX (US);
Frank A. Myers, Mansfield, TX (US);
Christopher J. Bollas, Grapevine, TX (US)

(73) Assignee: PVI Industries, LLC, Fort Worth, TX (US)

( * ) Notice: Subject to any disclaimer, the term of this patent is extended or adjusted under 35 U.S.C. 154(b) by 207 days.

(21) Appl. No.: 11/273,195

(22) Filed: Nov. 14, 2005

(65) Prior Publication Data

US 2007/0119962 A1    May 31, 2007

(51) Int. Cl.
*F24D 19/00*    (2006.01)

(52) U.S. Cl. .................. 122/40; 122/31.1; 237/8 B; 165/298

(58) Field of Classification Search .............. 122/20 R, 122/40, 31.1; 237/8 A–8 C, 8 R; 165/67, 165/68, 298–300
See application file for complete search history.

(56) References Cited

U.S. PATENT DOCUMENTS

| | | | | |
|---|---|---|---|---|
| 3,984,050 | A | * | 10/1976 | Gustafsson ................. 237/2 B |
| 4,444,016 | A | * | 4/1984 | Banerjee ....................... 62/617 |
| 4,445,023 | A | * | 4/1984 | McKenney ................. 392/341 |
| 4,545,134 | A | * | 10/1985 | Mukerjee et al. ............. 34/468 |
| 4,604,991 | A | * | 8/1986 | Miller ........................ 126/619 |
| 6,874,694 | B2 | * | 4/2005 | Saitoh et al. ................ 237/2 B |

OTHER PUBLICATIONS

Installation and Maintenance Manual for CSX Instantaneous Domestic Steam Water Heater, PVI Industries, Inc., Jan. 2003, pp. 1-10.
Armstrong Water Heaters, Flo-Rite Temp Web-Page, pp. 1-3, copyright 2005.

* cited by examiner

*Primary Examiner*—Gregory Wilson
(74) *Attorney, Agent, or Firm*—Charles D. Gunter, Jr.

(57) ABSTRACT

An improved shell-and-tube steam instantaneous heat exchange system of a closely coupled feedback design which overheats water in the heat exchanger portion of the system and then blends the water, as needed, with proportional amounts of cold water to achieve the correct outlet temperature for a wide range of flow rates. The system uses at least two primary heat exchangers to provide redundancy in the case of failure of a major component of the system. Steam flow through the heat exchangers is controlled by the use of steam traps, rather than using a thermostatically controlled valve to vary the supply of steam. To obtain precise temperature control during varying water volume use, water is directed from the blended outlet of a first water tempering valve into the hot inlet port of a second water tempering valve. The first valve is designed to blend cold and hot water to a predetermined temperature which is higher than the second water tempering valve, so as to bias the second tempering valve, thereby minimizing thermal hunting and providing tighter temperature control from the second tempering valve.

18 Claims, 6 Drawing Sheets

HEAT EXCHANGE SYSTEM

BACKGROUND OF THE INVENTION

A. Field of the Invention

This invention relates in general to heat exchange systems and, in particular, to an instantaneous steam fired water heater system.

B. Description of the Prior Art

Water heaters are used in a large variety of residential, commercial and industrial settings. For example, large storage tank systems are often found in hospitals and institutions, industrial plants, schools, universities, apartment complexes, and the like. The different types of water heaters which are used to supply hot water to these systems may use various sources of energy, such as gas, oil, electricity or steam. For example, in conventional gas/oil fired water heaters, hot gas flows through a series of vertically mounted tubes which are mounted in vertical fashion between top and bottom support plates within the water heater tank. Water flows into and out of a chamber located between the support plates and contacts and circulates about the exterior of the vertical tubes to effect heat transfer to heat the water.

U.S. Pat. No. 4,465,024, issued Aug. 14, 1984, and assigned to the assignee of the present invention describes another type of water heater which has a submerged, pressurized combustion chamber so that all combustion occurs in the water heater tank interior in a chamber surrounded by water, thereby reducing heat loss and increasing efficiency. These two examples are merely intended to be illustrative of the various types of gas/oil fired water heaters which exist in the prior art.

In some of the end applications mentioned above, such as, for example, in a municipal apartment complex or an industrial process, it may be more convenient and economical to utilize an existing source of steam or other hot fluid as the energy source for heating the water, rather than using gas or oil. There are a large number of prior art patents on devices in which liquids have been heated by fluids such as steam or other hot liquids. One of the common apparatus designs is the so called "shell-and-tube" heat exchanger. In conventional shell-and-tube heat exchangers, the tube section of the heat exchanger consists of a bundle of tubes which are open at both ends. At each end, the tubes extend through and are welded to a tube sheet. The shell of the heat exchanger completely encloses the bundle. The tubes within the bundle are spaced apart from each other, and from the shell, to define the shell-side section of the heat exchanger. In a typical heat exchanging operation, one of the fluids (liquid or gas) is passed through the tube section of the heat exchanger. The other fluid is then passed through the shell section, that is, on the outside of the tubes, often in a flow path which is countercurrent to the fluid flowing through the tube section.

Because the demand for hot water tends to vary over time in most installations, it is generally necessary to provide some sort of control over the heat source or flow rate through the device to accommodate the varying flow rates of the water being heated. In most applications the temperature of the water to be heated varies dramatically according to the time of year, and other factors. For example, a typical domestic hot water system is only under demand about 10-20% of the time. Additionally, in most applications the quantity of water flowing through the heat exchanger varies according to the time of day and use patterns of the application. Thus, the heat exchanger outlet water temperature must be regulated in order to accommodate variability resulting from the inlet water temperature and flow rate changes.

In the case of hot water storage systems utilizing bulk storage tanks, one type of existing control system is commonly referred to as the "feedback-type" system. These systems operate by sensing the temperature of the water in the storage tank, using a temperature sensing device in the tank to feed back instructions to a steam control valve. Because they respond to what has already happened, feedback systems are by their very nature reactive, i.e., they are a step behind demand. Thus, although they can supply a large volume of water, bulky tank systems are slow to react and waste energy to heat unused water. They also tend to require a large amount of floor space to accommodate the storage tank. Maintaining a leaking tank is expensive and replacement often involves tearing out walls of the surrounding structure.

A shell-and-tube heat exchanger of the appropriate design in an instantaneous feedback system can eliminate the need for a bulky hot water storage tank which can be subject to leaking and corrosion and can also eliminate the response time problem discussed above. In fact, tankless instantaneous feedback systems, i.e., a shell-and-tube heat exchanger with a temperature regulator, are known in the prior art. However, the typical tankless instantaneous feed back system of the prior art have generally attempted to control outlet water temperature by controlling steam flow through the heat exchanger. Because of the inherent thermal lag in this type control process, outlet water temperatures can vary greatly when faced with wide swings in inlet water temperature and flow. These swings can exceed 50% of the difference between the cold water temperature and the desired hot water temperature when flow through the water heater changes quickly from full water flow capability to zero flow and back to full flow.

Thus, despite the improvement in the art generally in the area of heat exchangers and water heaters of the above type, a need continues to exist for an improved instantaneous water heater design which utilizes steam from a local boiler or district plant to provide energy to heat water to a desired temperature for a variety of hot water end use applications and which solves the problems of thermal lag discussed above.

A need also exists for such a heat exchange system which provides redundancy in the case of failure of a major component of the system.

A need also exists for such a heat exchange system which provides adequate safety features to prevent any danger of scalding should a valve or other component of the system fail.

SUMMARY OF THE INVENTION

Accordingly, it is an object of the invention to provide an improved shell-and-tube steam fired instantaneous heat exchange system of a closely coupled feedback design which overheats water in the heat exchanger and then blends the water, as needed, with proportional amounts of cold water to achieve the correct outlet temperature for a wide range of flow rates.

Another object is to provide such a system which acts immediately upon a change of demand so that there is virtually no time lag, providing all the hot water which is needed instantly, up to the unit's capacity.

Another object of the invention is to provide such a system which has built-in redundancy in case a major component of the system were to fail in use.

Another object is to provide such an improved water heating system which incorporates appropriate safety features to reduce the risk of scalding should a valve or other component of the system fail.

Another object is to provide such a system which occupies relatively little floor space and which does not require tearing out walls for installation, repair or replacement.

Another object is to provide such an improved system which does not waste energy by constantly reheating stored water.

These and additional objects of the invention are realized by the improved heat exchange system of the invention which includes a first process shell-and-tube heat exchanger having a cold water inlet and at least a second process shell-and-tube heat exchanger also having a cold water inlet. The second process heat exchanger is mounted in a water circulating circuit in parallel fashion with the first process heat exchanger to provide redundancy in case of the failure of either of the first and second heat exchangers. A steam source continuously supplies steam to a selected one of a shell and a tube side of the first and second shell-and-tube heat exchangers. A steam trap is associated with each of the first and second heat exchangers for collecting steam condensate, each of the steam traps having a closed position and an open position for discharging condensate. The discharge of condensate serves to allow more steam to enter the respective heat exchanger to provide additional heat for transfer to the water being heated.

Each of the first and at least second heat exchangers also has associated therewith a first and a second water tempering valve mounted in series. Each water tempering valve has a cold inlet port and a hot inlet port and a blended water outlet. Water from the blended outlet of the first water tempering valve is directed to the hot inlet port of the second water tempering valve, the first water tempering valve acting to blend cold water and hot water to a predetermined temperature set point which is above a set point of the second water tempering valve, to thereby bias the second water tempering valve and minimize thermal hunting.

A secondary heat exchanger may also be provided having a first side for receiving hot condensate from the steam traps and having a second side. An additional water circulation circuit circulates a source of relatively colder water through the second side of the secondary heat exchanger to preheat the source of relatively colder water. The preheated water is circulated to the inlet of the first and second process heat exchangers. Preferably, the heat exchange system of the invention is used to supply hot water to a building having an existing building water recirculating circuit and water recirculating pump. The existing building water recirculating pump is used to pump relatively cooler building return water through the secondary heat exchanger to preheat the relatively cooler building water.

The system also preferably has a first temperature limiting device associated with the first water tempering valve and a second temperature limiting device associated with the second water tempering valve. The first temperature limiting device senses the water temperature in the blended water outlet of the first water tempering valve and acts to shut off the flow of hot water if the sensed temperature exceeds a predetermined limit. The second temperature limiting device senses the water temperature in the blended water outlet of the second water tempering valve and acts to shut off the flow of hot water if the sensed temperature exceeds a predetermined limit.

The water circulating circuit leading to the cold inlet of the second water tempering valve has a metering valve mounted therein. Each of the metering valves has a range of open positions and a fully closed position with a fixed orifice. The fixed orifice which is present in the fully closed position serves to maintain a minimum flow of cold water in the fully closed position in order to insure that water exiting the water tempering valve does not become too hot.

The heat exchange system of the invention also includes a rigid support frame for supporting one or more and preferably at least two, process heat exchangers and associated piping and components. The rigid support frame has a pair of spaced vertical support members connected by an upper and a lower cross member. The upper cross member has one or more angularly oriented support flanges mounted thereon for receiving an upper extent of process heat exchanger to support the heat exchanger. In this way, any load imposed by associated heat exchanger piping and components is transferred to the support stand through the support flange. The stand also includes an adjustable lower mounting bracket for each of the process heat exchangers which mounts on the lower cross member of the support stand for further stabilizing the process heat exchangers on the support stand. The upper cross member of the support stand is appropriately located to provide support for heavy components of the water blending valve and components with the components being approximately balanced on either side of the cross member. The lower cross member of the support stand is appropriately located to serve as a hanger support attachment point to carry the weight of the process heat exchanger associated lower piping, the secondary heat exchanger and associated components. The support stand can easily be expanded to accommodate multiple additional heat exchangers and water blending systems by extending the cross members.

Each of the vertical support members of the support stand is attached to a runner skid by means of a gusset member, each gusset member being positioned to contact a vertical support member at a planar contact surface. Each of the gusset members is preferably welded across the planar contact surface using a skip welding process to minimize heat deflection on the runner skid.

Each of the process heat exchangers has a steam side and a water side. Preferably, a backflow preventer valve is installed in a cold water supply conduit leading to the water side of each heat exchanger to maintain pressure on the heat exchanger if system water pressure is lost. Each of the process heat exchangers has a hot water outlet connected to a respective one of the water tempering valves by a portion of downward piping of a hot water conduit. The first water tempering valve of each of the process heat exchangers is mounted on the support stand at a selected horizontal elevation, the selected horizontal elevation being below the respective horizontal elevation of the process heat exchanger hot water outlet, the downward piping serving to act as a heat trap to retain hot water in the respective process heat exchanger during periods of no flow of hot water from the heat exchanger.

Additional objects, features and advantages will be apparent in the written description which follows.

DETAILED DESCRIPTION OF THE INVENTION

Figure 1:
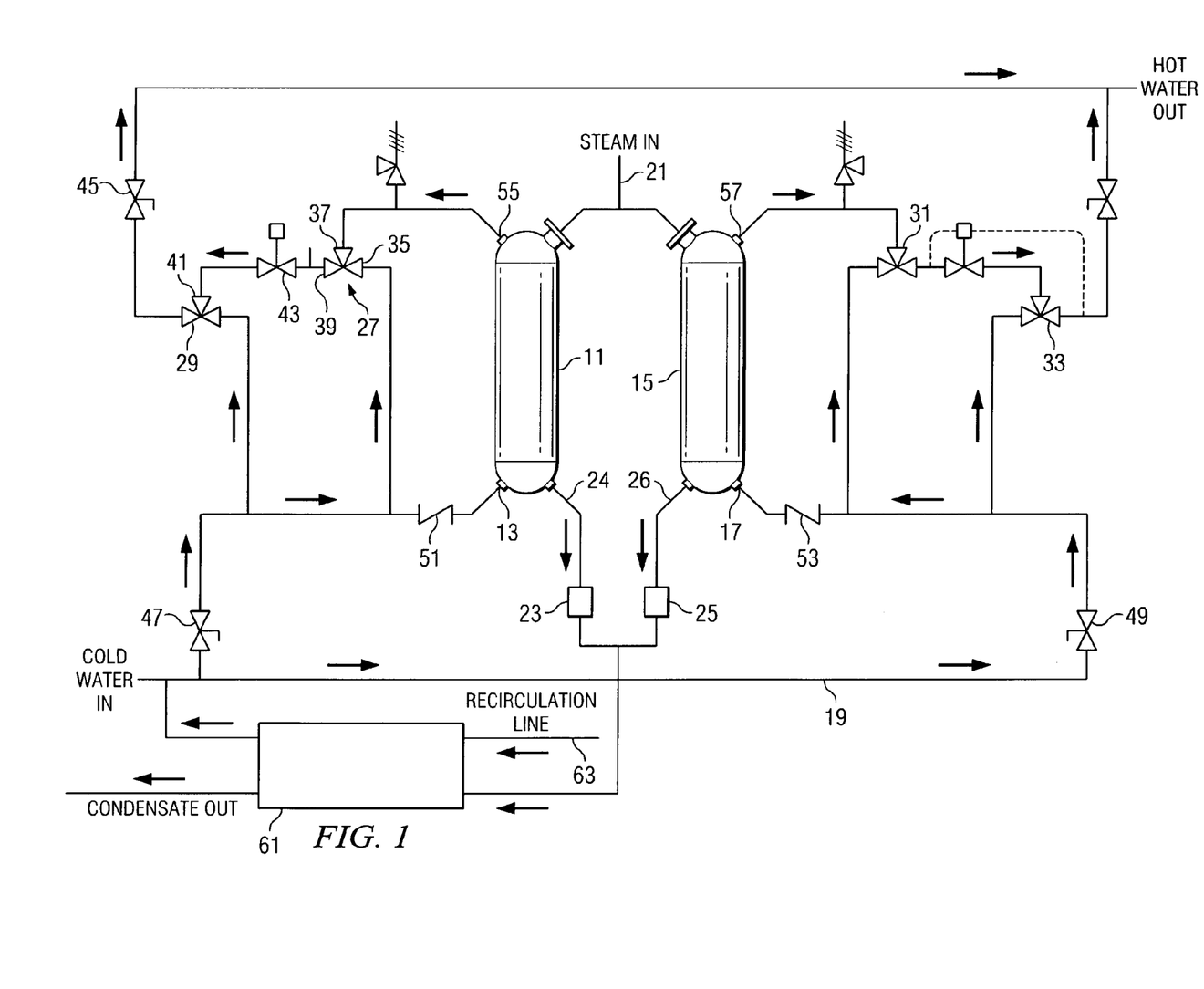
FIG. 1 is a simplified, schematic diagram illustrating the operation of the heat exchange system of the invention.

FIG. 1 is a schematic diagram illustrating the operational flow of the heat exchange system of the invention. In one embodiment, this instantaneous water heater system utilizes steam from a local boiler or district plant to provide energy to heat water up to a desired temperature for a variety of hot water end use applications. The water temperature control scheme which is illustrated in FIG. 1 and which will be described in greater detail herein operates with equal precision whether hot water or another hot fluid is used as the energy source to heat the process water up the desired end use temperature, or whether steam is utilized as the energy source.

The basic building blocks of the heat exchange system are a first process shell-and-tube 11 having a cold water inlet 13. Preferably, at least a second process shell-and-tube heat exchanger 15 is provided also having a cold water inlet 17 and being mounted in water circulating circuit 19 in parallel fashion with the first process heat exchanger 11 to provide redundancy in the case of the failure of either of the first and at least second heat exchanger systems 11, 15.

Each of the process heat exchangers 11, 15 are of conventional design. The particular heat exchangers which are illustrated contain a tube coil or bundle within an outer shell and a steam source 21 is provided for continuously supplying steam to a selected one of the shell-and-tube heat exchangers 11, 15. Preferably, the steam is supplied to the tube bundle side of the exchanger at about 250° F. with the water to be heated passing around the tube bundle through the heat exchanger shell.

When steam is used as the energy source, the steam flow through the heat exchangers 11, 15 is controlled by steam traps 23, 25, located in an outlet conduit 24, 26 from each heat exchanger tube bundle. As relatively colder water enters each heat exchanger 11, 15 through the heat exchanger shell, heat is transferred from the steam in the tube bundle to the surrounding water in the shell, thus condensing the steam and creating steam condensate. Each steam trap 23, 25 is set to open when a preset weight of condensate has been collected. As the steam traps 23, 25 open to discharge a preset amount of condensate, additional steam is able to enter each heat exchangers tube bundle which provides additional heat for transfer to the water in the heat exchanger shell.

As has been briefly discussed in the Background section of the application, the heat exchangers 11, 15 are sized to provide the heat transfer capability required to obtain the desired quantity of heated water from the system. The system also provides a unique control system which adapts to changes in demand on the system. In most applications, the temperature of the water to be heated varies dramatically according to the time of year and other factors. Also, in most applications, the quantity of water flowing through the heat exchanger tube bundles varies according to the time of day and use patterns of the application. The heat exchanger outlet water temperature must be regulated in order to accommodate variability resulting from the inlet water temperature and flow rate changes. However, Applicant's system does not attempt to control the outlet water temperature by controlling the steam flow through the heat exchanger using a temperature responsive valve. Systems which attempt to control the steam flow in this manner have an inherent thermal lag. As a result, the outlet water temperatures typically vary greatly when faced with wide swings and inlet water temperature and flow rates. These swings can exceed 50% of the difference between the cold water temperature and the desired hot water temperature when flow through the water heater changes quickly from full water flow capability to zero flow and back to full flow.

The present system operates upon a different principal in which hot water produced by the heat exchangers 11, 15 is always hotter than the required outlet temperature. As will be explained in greater detail, the overheated water flows into a series of water tempering valves to blend hot and cold water to achieve the ultimately desired outlet water temperature. The input of the steam from the steam source 21 to the heat exchanger tube bundle is unregulated and only controlled in terms of the condensate trap operation.

In one embodiment of the invention, the system provides accurate temperature regulation at constant flow rates and also allows temporary temperature excursions as the flow rate varies. This cruder type of control is often acceptable for industrial applications. In another embodiment of the device, the outlet water temperature downstream of the heat exchangers 11, 15 is controlled to within plus or minus 5° F., or less, at any flow rate exceeding five gallons per minute. Since the five gallons per minute flow rate is easily achieved with a regularly installed building piping loop recirculation pump, the tight water temperature control applies to all flow conditions, including near instantaneous changes between maximum water flow to zero flow and back to maximum flow.

To obtain this type water temperature control during varying water volume usage, each of the first and at least second heat exchangers 11, 15 also has associated therewith a first and second water blending valves mounted in series, such as valves 27, 29 for heat exchanger 11 and valves 31, 33 for heat exchanger 15. As can be seen from FIG. 1, the water blending valves are mounted in series with each water blending valve having a cold inlet port 35, a hot inlet port 37 and a blended water outlet 39, using blending valve 27 as an example. Water from the blended outlet 39 of the first water blending valve 27 is directed to the hot inlet port 41 of the second water blending valve 29. The first water blending valve 27 acts to blend cold water and hot water to a predetermined temperature set point which is above a set point of the second watering blending valve 29 to thereby bias the second water blending valve and minimize thermal hunting. For example, the set point of the first blending valve 27 is preferably set at about 10-30° F., most preferably about 20-25° F. higher than the blending valve 29. Because the second valve 29 does not see as wide a temperature fluctuation as the first valve 27, valve fluctuation and thermal hunting is minimized. An additional benefit of using two tempering or blending valves in series is the fact that the failure of a single valve would not allow excessively hot water to discharge from the water heater outlet. If the first water blending valve 27 fails in the full hot open position, the second water blending valve 29 will control the water temperature well below a maximum water temperature set condition. Likewise, a failure of the second water blending valve 29 in the full hot open position would result in water temperature being controlled by the first water blending valve 27.

In addition to the redundancy provided by the two water blending valves 27, 29 for each heat exchanger 11, 15 a first temperature limiting device 43 is associated with the first water blending valve 27 and a second temperature limiting device 45 is associated with the second water blending valve 29, for each of the heat exchanger systems. The first temperature limiting device 43 is operable to sense water temperature in the blended water outlet of the first water blending valve 27 and to shut off the flow of hot water if the sensed temperature exceeds a predetermined limit. In similar fashion, the second temperature limiting device 45 is operable to sense water temperature in the blended water outlet of the second water blending valve 29 and to shut off the flow of hot water if the sensed temperature exceeds a predetermined limit.

As an additional safety measure, the water circulating circuit 19 leading to the cold water inlet 35 of each secondary water blending valve has a metering valve 47, 49 mounted therein. Each of the metering valves is a gate valve having a range of open positions and a fully closed position which preset a fixed orifice. The fixed orifice serves to maintain a minimum flow of cold water even when the valves 47, 49 are in the fully closed position, to ensure that water exiting the water blending valve in question does not become too hot. A water backflow preventer in the form of a check valve 51, 53 is also installed in the cold water supply conduit leading to the cold water inlet 17 of each heat exchanger to maintain pressure on the heat exchanger if the system water pressure is lost.

Figure 2:
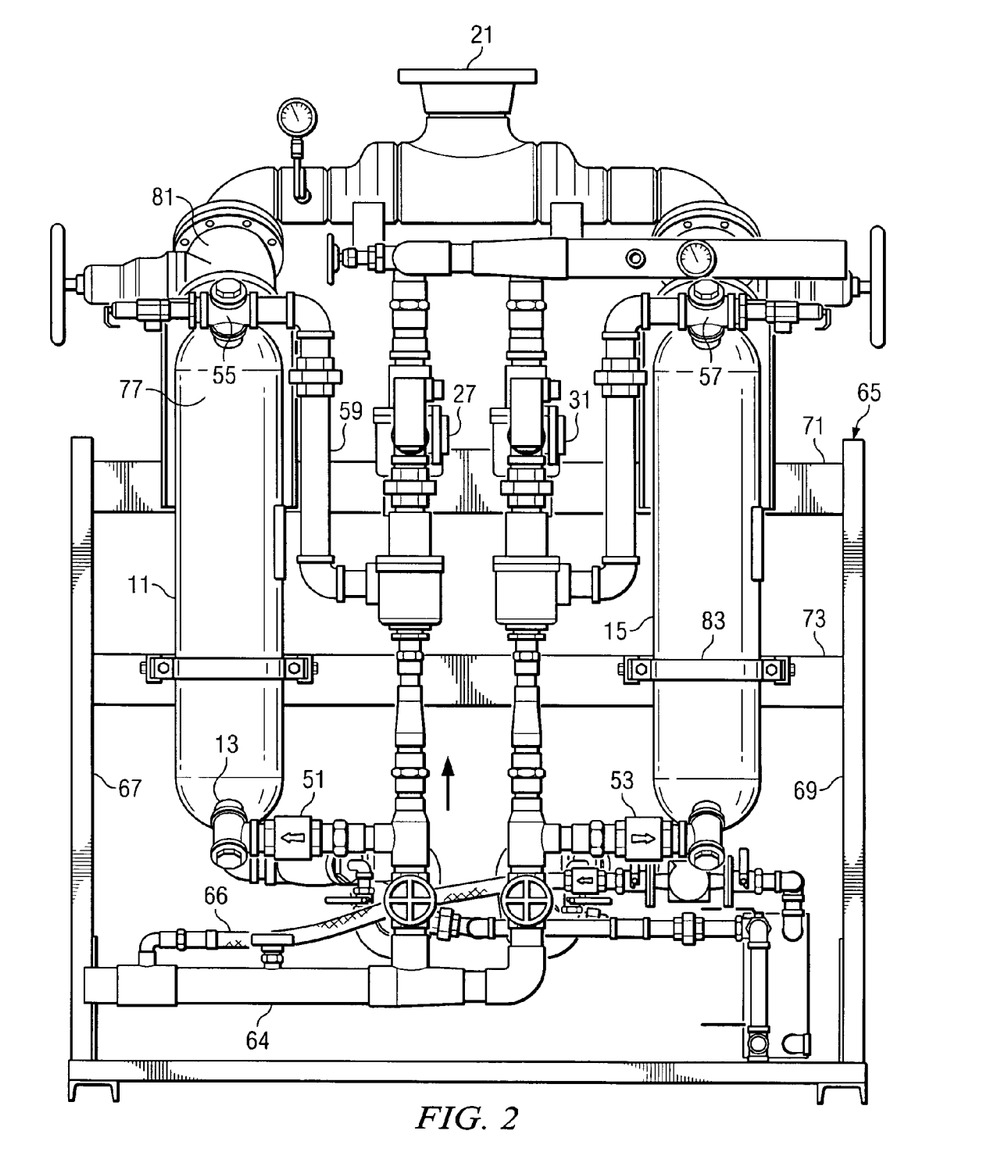
FIG. 2 is a front elevational view of the heat exchange system of the invention showing the principal components thereof.

As also will be appreciated with respect to FIGS. 1 and 2, each of the process heat exchangers 11, 15 have a hot water outlet 55, 57 which is connected to a respective one of the water blending valves (such as valve 27 in FIG. 1) by a portion of downward piping 59 of the hot water conduit. The first water blending valve (for example, valve 27) is therefore mounted (see FIG. 2) at a selected horizontal elevation, the selected horizontal elevation being below the respective horizontal elevation of the process heat exchanger hot water outlet 55. The downward piping 59 serves to act as a heat trap to retain hot water in the respective process heat exchanger 11, 15 during periods of no flow of hot water from the heat exchanger. In other words, the heat trap prevents heat from migrating into the remainder of the plumbing at no flow conditions.

Returning to FIG. 1, in one embodiment a secondary heat exchanger 61 is also provided having a first side for receiving hot condensate from the steam traps 23, 25 and having a second side. An additional water circulation conduit 63 is provided for circulating a source of relatively colder water through the second side of the secondary heat exchanger 61 to preheat the source of relatively colder water. The preheated water exiting the secondary heat exchanger 61 is circulated through the primary cold water circulation circuit 19 to the cold inlet of the first and second heat exchangers 11, 15.

Where the heat exchange system is used to supply hot water to a building having an existing building water recirculating circuit and a water recirculating pump, the existing building water recirculating pump can be used to pump relatively cooler building return water through the secondary heat exchanger 61 to preheat the relatively cooler building water before again passing it through the process heat exchangers 11, 15. The building return water is "relatively cooler" than the steam condensate, even though it is a part of the building hot water recirculating circuit.

Figure 10:
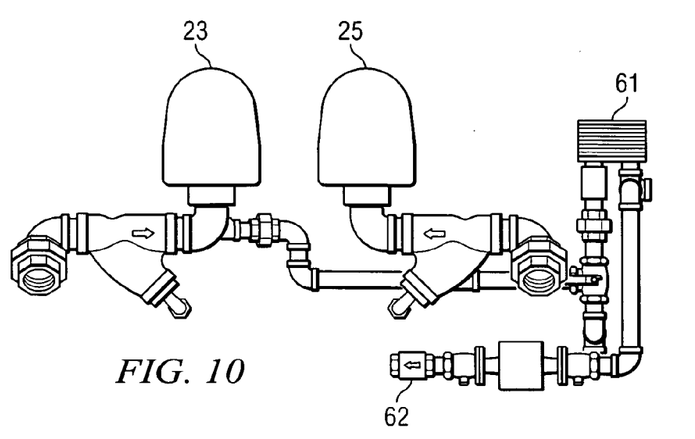
FIG. 10 is an isolated side view of certain of the piping components of the system of the invention.
Figure 11:
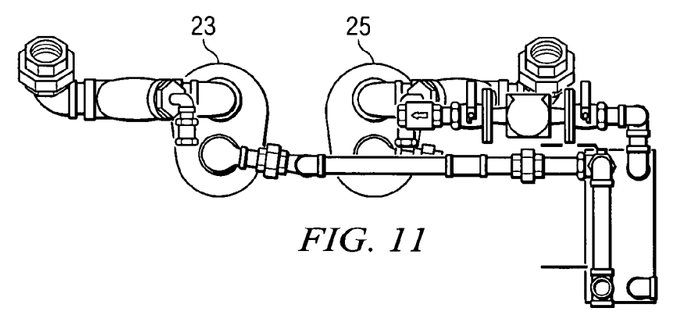
FIG. 11 is a top view, similar to FIG. 10, of the piping components of the system.
Figure 12:
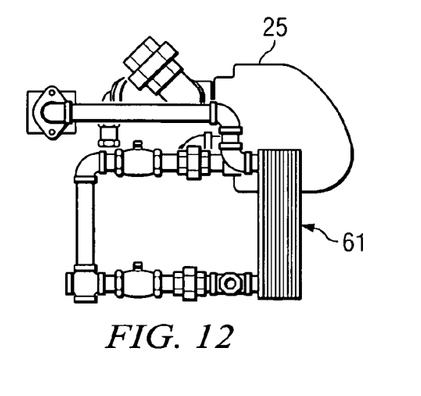
FIG. 12 is an isolated view of the plate heat exchanger and related piping which makeup the secondary heat exchanger of the system of the invention.
Figure 13:
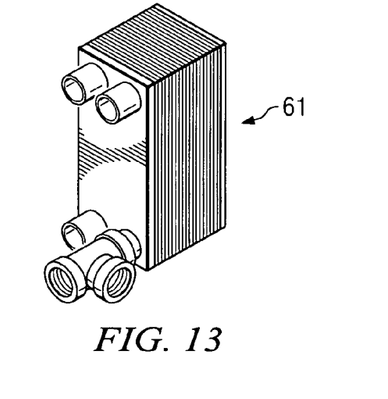
FIG. 13 is an isolated view of the plate heat exchanger of FIG. 12.

FIG. 13 shows the secondary heat exchanger in isolated fashion. In this case, the heat exchanger 61 is a plate type exchanger of conventional design. The heat exchanger receives return water at, for example 108° F., and discharges relatively hotter water at, for example 130° F., after heat exchange with the steam condensate which is typically at about 212° F. The outlet conduit (62 in FIG. 10) is connected to the cold water inlet conduit (64 in FIG. 2) by means of a flexible hose 66 which facilitates placement of the plumbing components on the support stand 65.

Figure 3:
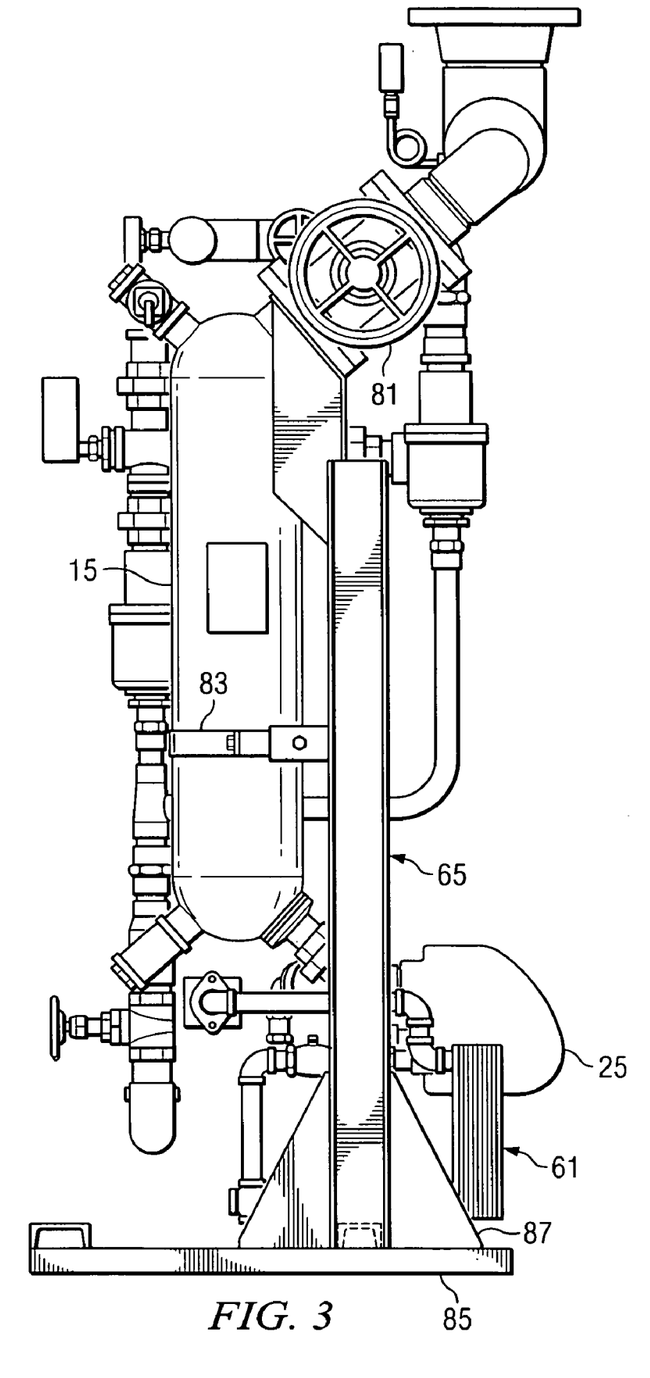
FIG. 3 is a side view of the heat exchange system of FIG. 2.
Figures 4, 5:
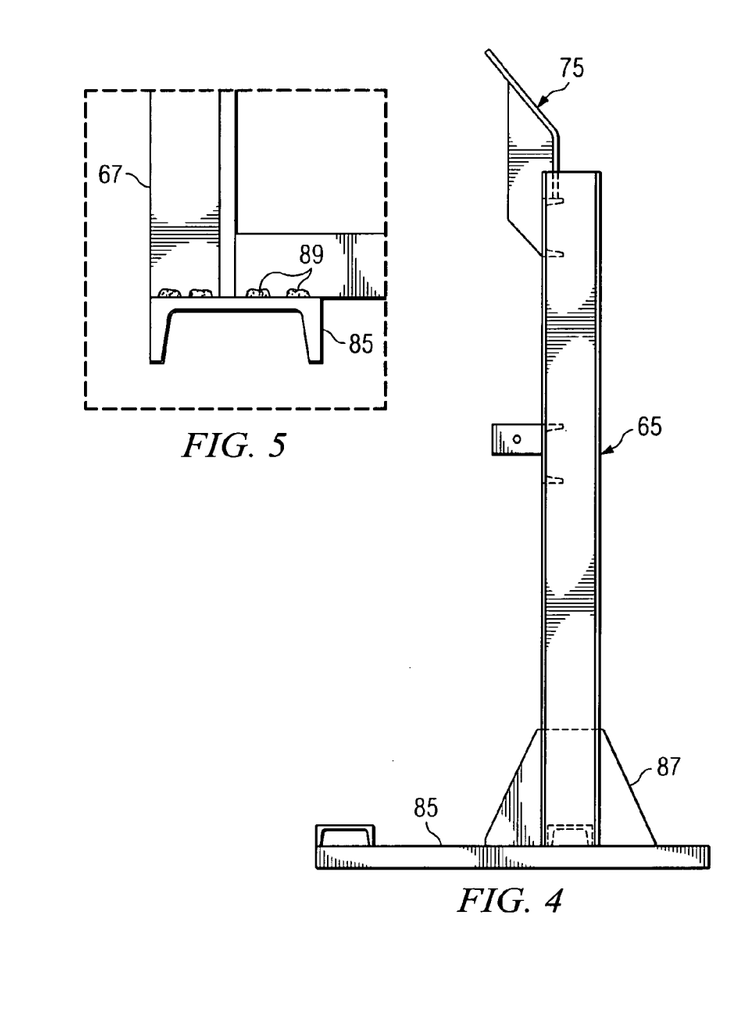
FIG. 4 is an isolated side view of the stand which is used to support the heat exchange components, valving and piping of the heat exchange system of the invention.
FIG. 5 is an isolated view of a portion of the skid runner and base of the stand of FIG. 4, showing the weld detail thereof.
Figure 6:
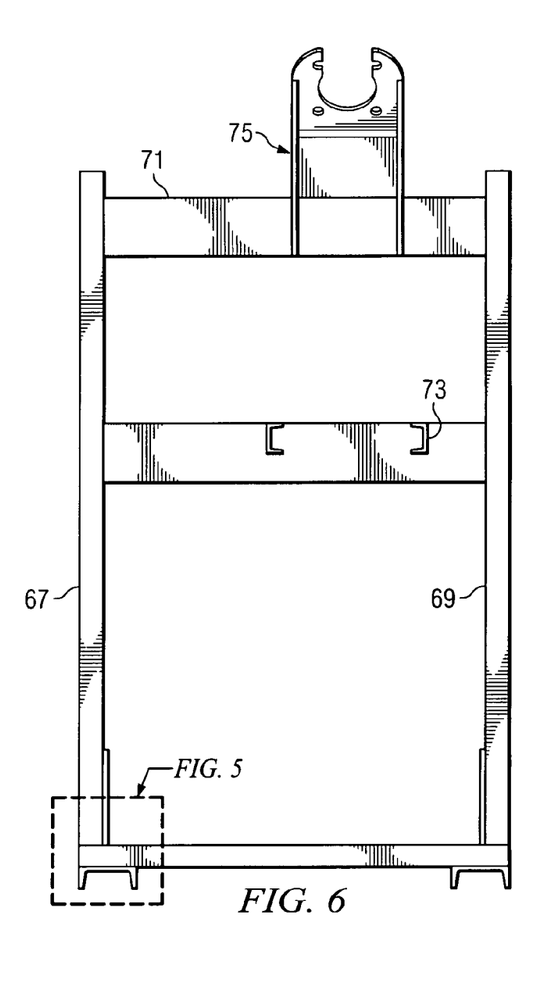
FIG. 6 is a front elevational view of the isolated stand of the invention.
Figure 7:
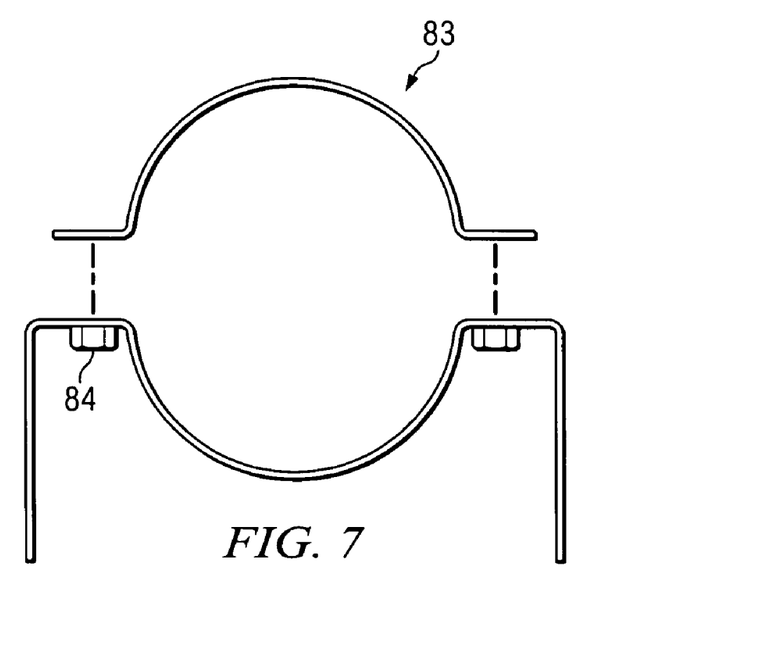
FIG. 7 is an isolated view of the bottom clamp used to mount a process heat exchanger on the stand of FIG. 6.
Figure 8:
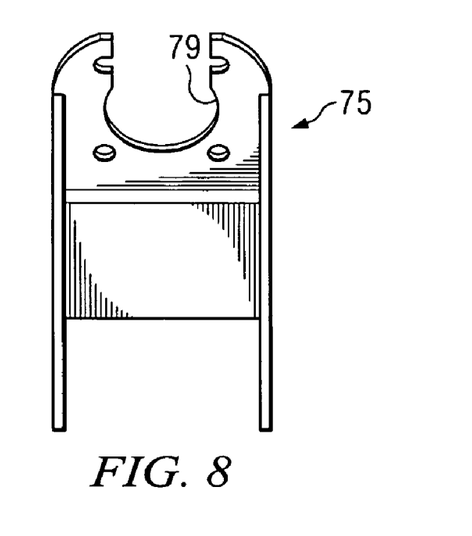
FIG. 8 is an isolated view of the top heat exchanger mounting flange used with the stand of the invention.
Figure 9:
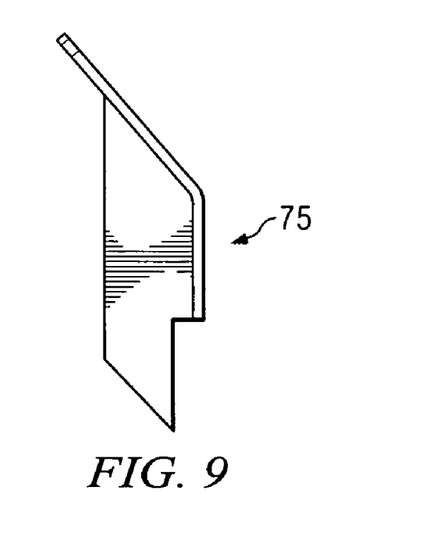
FIG. 9 is a side view of the flange of FIG. 8.

FIGS. 2-13 illustrate additional structural features of the heat exchange system of the invention. As best seen in FIGS. 2, 4 and 6, a rigid support frame or stand 65 is provided for supporting the first and second process heat exchangers 11, 15 and associated piping and components. The rigid support stand 65 has a pair of spaced vertical support members 67, 69 (FIG. 6) connected by an upper and a lower cross member 71, 73, respectively. The upper cross member 71, as shown in FIGS. 2 and 6 has an angularly oriented support flange (75 illustrated in FIG. 6) mounted thereon for receiving an upper extent (generally shown as 77 in FIG. 2) of a selected one of the process heat exchangers to support the heat exchangers. As shown in FIG. 8, the support flange 75 has a generally U-shaped opening 79 for engaging and supporting the heat exchanger 11. This also isolates the weight of the steam inlet 21 and associated piping (81 in FIG. 3), whereby the load imposed by the associated heat exchanger piping and components is transferred to the support stand 65 through the support flange 75.

As shown in FIGS. 2, 3, and 7, an adjustable lower mounting bracket 83 is provided for each of the process heat exchangers 11, 15 and mounts on the lower cross member 73 of the support stand 65 for further stabilizing the process heat exchangers on the support stand.

As will be appreciated, the heat exchanger flange support system provides support for the process heat exchangers 11, 15 to transfer steam piping angular and support loads to the stand 65. Traditional heat exchanger mounting arrangements have tended to result in all of the steam piping loads being carried by the flange to shell attachment. These loads can be substantial and can damage the flange to shell connection and cause other piping attached to the heat exchanger to move out of position or incur stress which can result in stress corrosion failure of certain heat exchanger designs and/or materials. Bolts 84 (FIG. 7) are received in a mating slot on the cross member 73 which allow adjustment of the vertical position of the mounting brackets 83.

In order to accommodate the position the heat exchanger after it is mounted to the stand 65 by the flange 75, the adjustable lower mounting bracket 83 is designed to attach to the heat exchanger in whatever position results from the flange mounting. The traditional strap type mounting method forces the heat exchanger to be held in a fixed position defined by the fixed saddle of the strap system. If the flange mounted heat exchanger of the invention was forced into this fixed saddle location and held in place by the strap position of the strap system, undesirable stress would be applied to the heat exchanger flange to shell connection.

As will also be appreciated with respect to FIG. 2, the upper cross member 71 is designed to provide support for the heavy components of the water blending system, such as valve 27 and its associated plumbing, which are approximately balanced on either side of the cross member 71 and which can be attached to it by an adjustable clamping system or other suitable arrangement. Similarly, the lower cross member 73 is designed to serve as a hanger support attachment point to carry the weight of the lower piping, secondary heat exchanger and associated components of the water blending system.

The steam instantaneous heat exchangers of the invention are designed for single or multiple attachments to the support stand 65. When provided as a multiple water heater, the individual water heater design accommodates attachment for combined inlet and outlet single point water connections. However, as has been discussed, multiple units can provide redundancy and can provide for higher water delivery. The support stand 65 can be expanded to accommodate multiple heat exchanger and water blending systems through the extension of the cross members 71, 73.

The frame weld design of the stand 65 is also customized in order minimize weld distortion at the frame. With reference to FIGS. 3-5, each of the vertical support members, such as member 67 in FIG. 5, is attached to a runner skid 85 by means of a gusset member 87. Each gusset member 87 is positioned to contact a vertical support member 67 at a planar contact surface. Each gusset member is welded across the planar contact surface using a skip welding pattern, such as the skips illustrated at 89 in FIG. 5. For example, instead of using a full weld, approximately ½" skips are provided to minimize the weld that crosses the flat side of the skid 85 in FIG. 5. This tends to minimize stress on the runner skids 85 and prevents buckling.

FIG. 2 and FIGS. 10-13 illustrate additional components of the plumbing, including the plumbing related to the secondary heat exchanger 61. As briefly discussed, where the building or other structure being serviced has an existing return recirculation pump and water circuit, the significant energy which is contained in the steam condensate in the traps 23, 25 can be used to preheat the recirculated return water, thereby improving the efficiency of the system. The energy from the steam traps 23, 25 can be captured and used to preheat the water coming into the heat exchangers 11, 15 by using the secondary heat exchanger or sub-cooler 61. Traditionally, the building water circulation system will have a pump added to the system to move a portion of the cold supply water through the secondary heat exchanger 61, followed by adding this heated water back into the cold water entering the process heat exchanger. In one embodiment of the invention, the existing building recirculation pump (not shown) is used to pump the cooler building return water through the secondary heat exchanger 61 and then into the cold water inlet of the process heat exchanger 11, simplifying the piping system and avoiding the cost of an independent secondary heat exchanger pump. Other arrangements are also possible. For example, a "T" and balancing valves could be added to the suction side of the existing building recirculation pump so that the one pump can return recirculated water and draw cold supply water through the secondary heat exchanger 61 through separate piping.

An invention has been provided with several advantages. The system of the invention utilizes steam from any convenient source to provide energy to heat water to a desired temperature for a variety of hot water end use applications. The thermal lag which has tended to characterize the prior art instantaneous systems is eliminated providing near instantaneous water temperature control. Outlet water temperature downstream of the water heater system can be controlled to within plus or minus 5° F., or less at any flow rate exceeding five gallons per minute. The five gallon per minute flow rate is easily achieved with a conventionally installed building pipe loop recirculation pump. The tight water temperature control achieved with the system of the invention applies to all flow conditions, including near instantaneous changes between maximum water flow to zero flow and back to maximum flow. A variety of safety features ensure that no scalding water or steam is delivered through the water outlets in the event of failure of major component of the system.

While the invention has been shown in several of its forms, it is not thus limited but is susceptible to various changes and modifications without departing from the spirit thereof.

We claim:

1. A heat exchange system for heating water, comprising:
a first process shell-and-tube heat exchanger having a cold water inlet and a hot water outlet;
at least a second process shell-and-tube heat exchanger also having a cold water inlet and being mounted in a water circulating circuit in parallel fashion with the first process heat exchanger to provide redundancy in case of the failure of either of the first and at least second heat exchangers;
a steam source for continuously supplying steam to a selected one of a shell and a tube side of the first and second shell-and-tube heat exchangers;
a steam trap associated with each of the first and at least second heat exchangers for collecting steam condensate, each of the steam traps having a closed position and an open position for discharging condensate, the discharge of condensate serving to allow more steam to enter the respective heat exchanger to provide additional heat for transfer to the water being heated;
each of the first and at least second heat exchangers also having associated therewith a first and a second water blending valves mounted in series, each water blending valve having a cold inlet port and a hot inlet port and a blended water outlet, water from the blended outlet of the first water blending valve being directed to the hot inlet port of the second water blending valve, the first water blending valve acting to blend cold water and hot water to a predetermined temperature set point which is above a set point of the second water blending valve, to thereby bias the second water blending valve and minimize thermal hunting;
a secondary heat exchanger having a first side for receiving hot condensate from the steam traps and having a second side;
an additional water circulation circuit for circulating a source of relatively colder water through the second side of the secondary heat exchanger to preheat the source of relatively colder water, the preheated water being circulated to the inlet of the first and at least second heat exchangers.

2. The heat exchange system of claim 1, further comprising:
   a first temperature limiting device associated with the first water blending valve and a second temperature limiting device associated with the second water blending valve, the first temperature limiting device being operable to sense water temperature in the blended water outlet of the first water blending valve and to shut off the flow of hot water if the sensed temperature exceeds a predetermined limit, and the second temperature limiting device being operable to sense water temperature in the blended water outlet of the second water blending valve and to shut off the flow of hot water if the sensed temperature exceeds a predetermined limit.

3. The heat exchange system of claim 1, wherein the first water blending valve is designed to blend cold and hot water to approximately 10-30° F. higher than the second water blending valve, so as to bias the second water blending valve and limit thermal hunting.

4. The heat exchange system of claim 1, wherein the water circulating circuit leading to the cold inlet of each second water blending valve has a metering valve mounted therein, each of the metering valves having a range of open positions and a fully closed position provided with a fixed orifice, the fixed orifice serving to maintain a minimum flow of cold water in the fully closed position in order to insure that water exiting the water tempering valve and the heat exchange system does not become too hot.

5. The heat exchange system of claim 1, wherein the system further comprises:
   a rigid support stand for supporting the first and at least second process heat exchangers and associated piping and components, the rigid support stand having a pair of spaced vertical support members connected by an upper and a lower cross member, and wherein the upper cross member has a pair of angularly oriented support flanges mounted thereon for receiving an upper extent of a selected one of the process heat exchangers to support the heat exchangers, whereby any load imposed by associated heat exchanger piping and components is transferred to the support stand through the support flange.

6. The heat exchange system of claim 5, further comprising:
   an adjustable lower mounting bracket for each of the process heat exchangers which mounts on the lower cross member of the support stand for further stabilizing the process heat exchangers on the support stand.

7. The heat exchange system of claim 5, wherein the upper cross member of the support stand is appropriately located to provide support for heavy components of the water blending with the components being approximately balanced on either side of the cross member.

8. The heat exchange system of claim 5, wherein the lower cross member of the support stand is appropriately located to serve as a hanger support attachment point to carry the weight of the process heat exchanger associated lower piping, the secondary heat exchanger and associated components.

9. The heat exchange system of claim 5, wherein the support stand can be expanded to accommodate multiple additional heat exchangers and water blending systems by extending the cross members.

10. The heat exchange system of claim 5, wherein each of the vertical support members is attached to a runner skid by means of a gusset member, each gusset member being positioned to contact a vertical support member at a planar contact surface, and wherein each gusset member is welded across the planar contact surface using a skip welding pattern to minimize stress on the runner skid.

11. The heat exchange system of claim 5, wherein each of the process heat exchangers has a hot water outlet connected to a respective one of the water tempering valves by a portion of downward piping of a hot water conduit, and wherein the first water tempering valve of each of the process heat exchangers is mounted on the support stand at a selected horizontal elevation, the selected horizontal elevation being below the respective horizontal elevation of the process heat exchanger hot water outlet, the downward piping serving to act as a heat trap to retain hot water in the respective process heat exchanger during periods of no flow of hot water from the heat exchanger.

12. The heat exchange system of claim 1, wherein the heat exchanger system is used to supply hot water to a building having an existing building water recirculating circuit and water recirculating pump, and wherein the existing building water recirculating pump is used to pump relatively cooler building return water through the secondary heat exchanger to preheat the relatively cooler building water.

13. The heat exchange system of claim 1, wherein each of the process heat exchangers has a steam side and a water side, and wherein a backflow preventer valve is installed in a cold water supply conduit leading to the water side of each heat exchanger to maintain pressure on the heat exchanger if system water pressure is lost, thus preventing introduction of steam into the hot water outlet and any subsequent building outlets.

14. An instantaneous, forward flow steam fed water heater for heating water being supplied to a building having an existing hot water recirculating pump and hot water recirculating circuit, the water heater, comprising:
   a first process shell-and-tube heat exchanger having a cold water inlet and a hot water outlet;
   a second process shell-and-tube heat exchanger also having a cold water inlet and being mounted in a water circulating circuit in parallel fashion with the first primary heat exchanger to provide redundancy in case of the failure of either of the first and at least second heat exchangers;
   a steam source for continuously supplying steam to a selected one of a shell and a tube side of the first and second shell-and-tube heat exchangers;
   a steam trap associated with each of the first and second heat exchangers for collecting steam condensate, each of the steam traps having a closed position and an open position for discharging condensate, the discharge of condensate serving to allow more steam to enter the respective heat exchanger to provide additional heat for transfer to the water being heated;
   each of the first and second heat exchangers also having associated therewith a first and a second water blending valves mounted in series, each water blending valve having a cold inlet port and a hot inlet port and a blended water outlet, water from the blended outlet of the first water blending valve being directed to the hot inlet port of the second water blending valve, the first water blending valve acting to blend cold water and hot water to a predetermined temperature set point which is above a set point of the second water tempering valve, to thereby bias the second water tempering valve and minimize thermal hunting;
   a first temperature limiting device associated with the first water blending valve and a second temperature limiting device associated with the second water blending valve, the first temperature limiting device being operable to sense water temperature in the blended water outlet of the first water blending valve and to shut off the flow of hot water if the sensed temperature exceeds a predetermined limit, and the second temperature limiting device being operable to sense water temperature in the blended water outlet of the second water blending valve and to shut off the flow of hot water if the sensed temperature exceeds a predetermined limit.

a secondary heat exchanger having a first side for receiving hot condensate from the steam traps and having a second side;

and wherein the existing building water recirculating pump is used to pump relatively cooler building return water through the second side of the secondary heat exchanger to preheat the relatively cooler building water, the preheated water being circulated to the inlet of the first and second heat exchangers.

15. The water heater of claim 14, further comprising:

a first temperature limiting device associated with the first water blending valve and a second temperature limiting device associated with the second water blending valve, the first temperature limiting device being operable to sense water temperature in the blended water outlet of the first water blending valve and to shut off the flow of hot water if the sensed temperature exceeds a predetermined limit, and the second temperature limiting device being operable to sense water temperature in the blended water outlet of the second water blending valve and to shut off the flow of hot water if the sensed temperature exceeds a predetermined limit.

16. The water heater of claim 14, wherein the first water blending valve is designed to blend cold and hot water to approximately 10-30° F. higher than the second water blending valve, so as to bias the second water tempering valve and limit thermal hunting.

17. The water heater of claim 14, wherein each of the process heat exchangers has a steam side and a water side, and wherein a backflow preventer valve is installed in a cold water supply conduit leading to the water side of each heat exchanger to maintain pressure on the heat exchanger if system water pressure is lost, thus preventing introduction of steam into the hot water outlet and any subsequent building outlets.

18. The water heater of claim 14, wherein each of the process heat exchanger's hot water outlets is connected to a respective one of the water blending valves by a portion of downward piping of a hot water conduit, and wherein the first water tempering valve of each of the process heat exchangers is mounted on a support stand at a selected horizontal elevation, the selected horizontal elevation being below the respective horizontal elevation of the process heat exchanger hot water outlet, the downward piping serving to act as a heat trap to retain hot water in the respective process heat exchanger during periods of no flow of hot water from the heat exchanger.

* * * * *